United States Patent
Schmidt

(10) Patent No.: US 7,154,969 B2
(45) Date of Patent: Dec. 26, 2006

(54) METHOD FOR SHARED ESTIMATION OF PARAMETERS

(75) Inventor: Kurt Schmidt, Grafing (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 811 days.

(21) Appl. No.: 10/301,685

(22) Filed: Nov. 22, 2002

(65) Prior Publication Data

US 2003/0105784 A1    Jun. 5, 2003

(30) Foreign Application Priority Data

Nov. 22, 2001 (DE) ................ 101 57 247

(51) Int. Cl.
*H03D 1/04* (2006.01)
*H03D 1/06* (2006.01)
*H03K 5/01* (2006.01)
*H03K 6/04* (2006.01)
*H04B 1/00* (2006.01)

(52) U.S. Cl. .............. 375/346; 375/226; 375/230; 375/229; 375/350

(58) Field of Classification Search ........ 375/229–233, 375/226, 350, 346, 324
See application file for complete search history.

(56) References Cited

U.S. PATENT DOCUMENTS

| | | | | |
|---|---|---|---|---|
| 5,187,719 A | * | 2/1993 | Birgenheier et al. | 375/226 |
| 5,602,507 A | * | 2/1997 | Suzuki | 329/304 |
| 6,724,841 B1 | * | 4/2004 | Piirainen | 375/346 |
| 6,904,110 B1 | * | 6/2005 | Trans et al. | 375/350 |
| 2003/0007554 A1 | * | 1/2003 | Birru | 375/233 |
| 2003/0058927 A1 | * | 3/2003 | Douglas et al. | 375/147 |

OTHER PUBLICATIONS

Mashhour, Ashkan, Borjak, Assaad: A Method for Computing Error Vector Magnitude in GSM EDGE Systems—Simulation Results. In: IEEE Communications Letters, vol. 5, No. 3, Mar. 2001, pp. 88-91.

* cited by examiner

*Primary Examiner*—Phuong Phu
(74) *Attorney, Agent, or Firm*—Birch, Stewart, Kolasch, and Birch, LLP

(57) ABSTRACT

A method for shared estimation of parameters ($\epsilon$, $\phi$, $|C_1|$, $C_0$, $\alpha$, $\Delta\omega$) is described, which together with an error vector $e(k)$, describe the connection between a digitally modulated reference signal inputted to a transmission channel and a received receiver signal $z(k)$ which is at an end of the transmission channel. The method includes the following steps: forming the error vector $e(k)$ in dependence of the parameters ($\epsilon$, $\phi$, $|C_1|$, $C_0$, $\alpha$, $\Delta\omega$), a reference signal $s(k)$, and the receiver signal $z(k)$; linearizing the error vector $e(k)$; substituting a real parameter of the linearized error vector through components of a estimation vector, wherein a substituted error vector is produced; inserting the substituted error vector into the cost function; and determining the estimation vector through gradient development of the cost function and subsequently setting the gradient to zero.

12 Claims, 3 Drawing Sheets

Fig. 2

METHOD FOR SHARED ESTIMATION OF PARAMETERS

This nonprovisional application claims priority under 35 U.S.C. § 119(a) on Patent Application No. 101 57 247.6 filed in Germany on Nov. 22, 2001, which is herein incorporated by reference.

BACKGROUND OF THE INVENTION

1. Field of the Invention

The present invention relates to a method and computer program for shared estimation of parameters, in particular to the determination of "Error Vector Magnitude" (hereinafter "EVM").

2. Description of the Background Art

The "Error Vector Magnitude" (EVM) is used often, to estimate the linearity of a digitally modulated mobile radio system. For Example, the standard "GSM 05.05, version 8.5.0, Draft ETSI EN 300 910 V.8.5.0, (2000–07), Annex G" (hereinafter "the standard") defines the requirements on the EVM for the 8-PSK GSM EDGE-System. However, the standard does not define algorithms in order to determine the EVM.

FIG. 1 shows an example configuration, in accordance with the above given standard, of a transmission channel 20 having different parameters $\epsilon$, w, $C_1$, and $C_0$. The parameter $\epsilon$ represents a time shift, that determines the signal in the delay 21 of the configuration, e(k) is an error vector which is added in the configuration in a adder 22, $C_1$ is a complex amplification which is added in the multiplier 23, and $C_0$ represents a constant level of a DC-offset. The parameter $W^k$ is used to model the time response during a burst (transmit block), for example due to a heating up of the amplifier.

The following allocations are applied:

$T_s$: symbol period;
  The sequence of the configuration, are present before the symbol clock of the time points $kT_s$.
s(k): reference signal: is a trouble-free input signal after the measurement filter in the receiver to the symbol-time points $kT_s$;
e(k): error vector;
$\epsilon$: resultant time shift due to a non-ideal estimation of the preceding coarse time shift estimation;
$C_1$: complex amplification (gain) of the measurement signal;
$C_0$: constant level of a (DC) offset in the measurement signal; and
$w = e^{\alpha + j\Delta\omega T_s}$ $\alpha$ describes the change in amplitude of the measurement signal, which, for example, because of the heating up of the amplifier, causes a higher signal level to arise within the bursts.
  Furthermore, through $\Delta\omega$ the resultant frequency shift is modeled due to the preceding non-ideal coarse frequency estimation.

From the reference signal s(k), the following received signal z(k) results:

$$z(k) = \{C_0 + C_1 \cdot [s(k) + e(k)]\} \cdot w^k. \tag{1}$$

The error vector e(k) is determined by:

$$e(k) = \frac{z(k) \cdot w^{-k}}{C_1} - \frac{C_0}{C_1} - s(k - \epsilon). \tag{2}$$

In view of this model, a total of seven real parameters have to be estimated. It is noted that the time shift $\epsilon$, in view of the excessive sampled sequence, is to be understood to fulfill the sample theorem.

The "Error-Vector magnitude" (EVM) is calculated over a burst and is defined as follows:

$$EVM = \sqrt{\sum_k |e(k)|^2 / \sum_k |s(k)|^2}. \tag{3}$$

To determine the "Error-Vector magnitude" (EVM), the parameters $\epsilon$, $C_0$, $C_1$ and w, must be estimated such that a minimum of the "Error-Vector magnitude" (EVM) per burst results. Through the use of this parameter, the individual error vector e(k) can be calculated for each symbol.

The article "A Method for Computing Error Vector Magnitude in GSM EDGE Systems—Simulation Results," IEEE Communications Letters, VOL. 5, NO. 3, March 2001, pages 88 to 91, discloses a method to determine the parameters $\epsilon$, $C_0$, $C_1$ and w. This conventional method is, however, not very efficient. For one, the conventional method has the disadvantage that the time shift $\epsilon$ is not subjected to a common estimation with the parameters $C_0$, $C_1$, and w, but that only a coarse estimation of the time shift $\epsilon$ is performed before the common estimation of the parameters $C_0$, $C_1$ and w. Moreover, the conventional method has the disadvantage that a gradient method has to be used, which converges relatively slowly. The conventional method requires therefore, a relatively large number of iterations, which are dependent on the arbitrary start values for $C_0$, $C_1$ and w.

SUMMARY OF THE INVENTION

It is, therefore, an object of the present invention to provide a method to commonly estimate several parameters, which together with the error vector describes the connection between a digitally modulated reference signal fed through the transmission channel and a received signal that is received at the end of the transmission channel, which method utilizes a fewer number of iterations and converges quickly. The invention also provides a computer program to execute the method.

A preferred embodiment of the method of the invention, uses a linearization and a substitution to calculate the parameters analytically. Because of linearization, a minor error arises. Through iterative repetition, the linearization error can be desirably reduced. In the norm, two iterations are sufficient. These are substantially fewer iterations than those needed in the conventional method.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, are not limitive of the present invention, and wherein:

FIG. 2 is a table which represents the elements $M_{i,j}$ of the Matrix M and the components $b_i$ of the vector b.

DETAILED DESCRIPTION OF THE PREFERRED EMBODIMENTS

Figure 1:
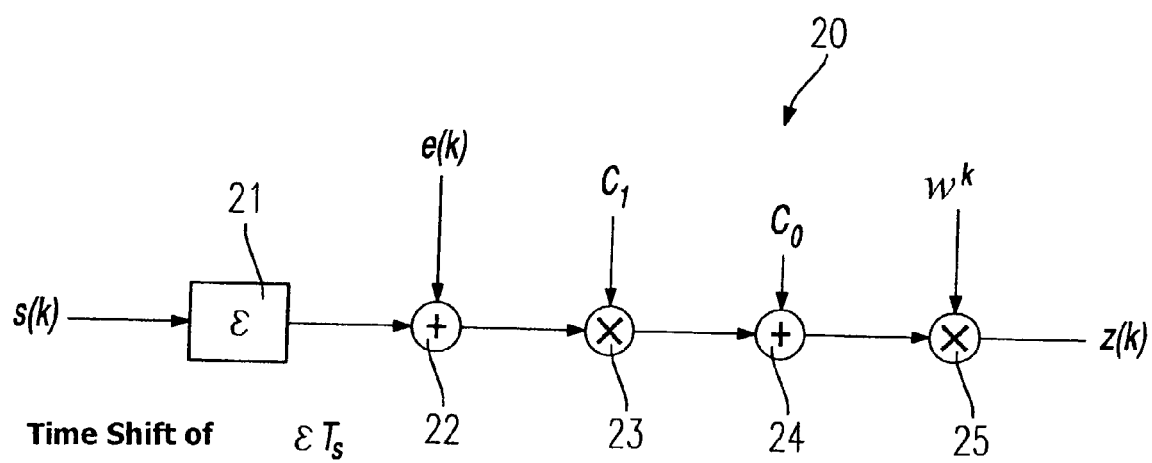
FIG. 1 is a configuration of a transmission channel.

The estimation method according to a preferred embodiment of the invention is described herein below, wherein estimated parameters are a time shift $\epsilon$, a phase shift $\phi$, a amplification $|C_1|$, a constant level shift $C_0$, a amplitude change $\alpha$, and a frequency shift $\Delta\omega$, which determine a reference signal $s(k)$ in the transmission channel. The method according to the invention is not limited to this application example, and is also suitable for the estimation of other parameters, which characterize the transmission channel.

The estimated parameters are determined through the minimization of the cost function:

$$L(\tilde{x}) = \sum_k |\tilde{e}(k)|^2 \quad (4)$$

wherein K is the symbol number within the evaluation area ("useful part," e.g. a burst). Generally, in this invention, a test parameter is represented by a "snake" and the estimated parameter is represented by a "roof," that is, $\hat{x}$ describes generally the parameter that is to be estimated, and $\tilde{e}(k)$ describes a therefrom resultant test-error vector.

Subsequently, the estimation according to a preferred embodiment is deduced. In the deduction, for the purpose of improving the overview, no iteration specific nomenclature is used.

In $C_1$ the amplification (gain) $|C_1|$ and the remaining phase shift $\phi$ is modeled through the non-ideal preceding phase compensation according to:

$$C_1 = |C_1| \cdot e^{j\phi} \quad (5)$$

In w, according to:

$$w = e^{\alpha + j\Delta\omega T_s} \quad (6)$$

the amplitude change $\alpha$ in the measurement signal and the resultant frequency shift $\Delta\omega$, is modeled.

By substituting the equations (5) and (6) into equation (2) the error vector is determined $$e(k) = \frac{1}{|C_1|} \cdot z(k) \cdot e^{-\alpha k - j\Delta\omega k T_s - j\varphi} - \frac{C_0}{C_1} - s(k - \varepsilon) \quad (7)$$

Due to the preceding coarse estimation, a linearization in equation (7) is allowable: for a complex x, via Taylor series expansion, $e^x$ is generally linearized by $$e^x \approx 1 + x. \quad (8)$$

Furthermore, the time shift $s(k-\epsilon)$ is linearized by $$s(k-\epsilon) = s(k) - \epsilon \cdot s_d(k). \quad (9)$$

It is noted that the normed derivative $s_d(k)$ is not allowed to be calculated from $s(k)$, because $s(k)$ does not fulfill the sample theorem. Rather, the over-sampled sequence $s_{ov}(k)$ should be used.

By substituting equations (8) and (9) into equation (7), the linearization error vector is obtained:

$$e(k) = \frac{1}{|C_1|} \cdot z(k) \cdot [1 - \alpha k - j \cdot \Delta\omega k T_s - j\varphi] - \frac{C_0}{C_1} - [s(k) - \varepsilon \cdot s_d(k)]. \quad (10)$$

Through substitution, the real parameters $x_i$ of the vector x is determined, according to:

$$e(k) = z(k) \cdot \left[ \underbrace{\frac{1}{|C_1|}}_{x_1} - \underbrace{\frac{\alpha}{|C_1|}}_{x_7} \cdot k - j \cdot \underbrace{\frac{\Delta\omega T_s}{|C_1|}}_{x_2} \cdot k - j \cdot \underbrace{\frac{\varphi}{|C_1|}}_{x_3} \right] - \underbrace{\frac{C_0}{C_1}}_{x_4 + j \cdot x_5} + \underbrace{\varepsilon}_{x_6} \cdot s_d(k) - s(k). \quad (11)$$

The real estimation value vector is defined through:

$$x = (x_1 x_2 x_3 x_4 x_5 x_6 x_7)^T$$

Through conversion, according to equation (11), the estimation values to be focused on from the estimation value vector x are determined according to:

$$|C_1| = 1/x_1$$
$$\Delta\omega T_s = x_2 \cdot |C_1|$$
$$\Delta\phi = x_3 \cdot |C_1|$$
$$C_1 = |C_1| \cdot e^{j\phi}$$
$$C_0 = C_1 \cdot (x_4 + j \cdot x_5)$$
$$\epsilon = x_6$$
$$\alpha = x_7 \cdot |C_1| \quad (12)$$

by defining the function $f_i(k)$, equation (10) results in:

$$e(k) = \sum_{i=1}^{N} x_i \cdot f_i(k) - s(k)$$

with $$f_1(k)=z(k) f_2(k)=-j\cdot k\cdot z(k) f_3(k)=-j\cdot z(k) f_4(k)=-1 \ f_5(k)$$
$$=-j \ f_6(k)=s_d(k) f_7(k)=-z(k)\cdot k \quad (13)$$

Through gradient development, the cost function L(x) and the subsequent zero setting of the gradient, the estimation value vector $\hat{x}$ is obtained according to:

$$\hat{x}=M^{-1}\cdot b \quad (14)$$

with the matrix and vector elements being:

$$M_{i,j} = \text{Re}\left\{\sum_k f_i^*(k)\cdot f_j(k)\right\} \quad (15)$$

$$b_i = \text{Re}\left\{\sum_k f_i^*(k)\cdot s(k)\right\}.$$

Figure 2:
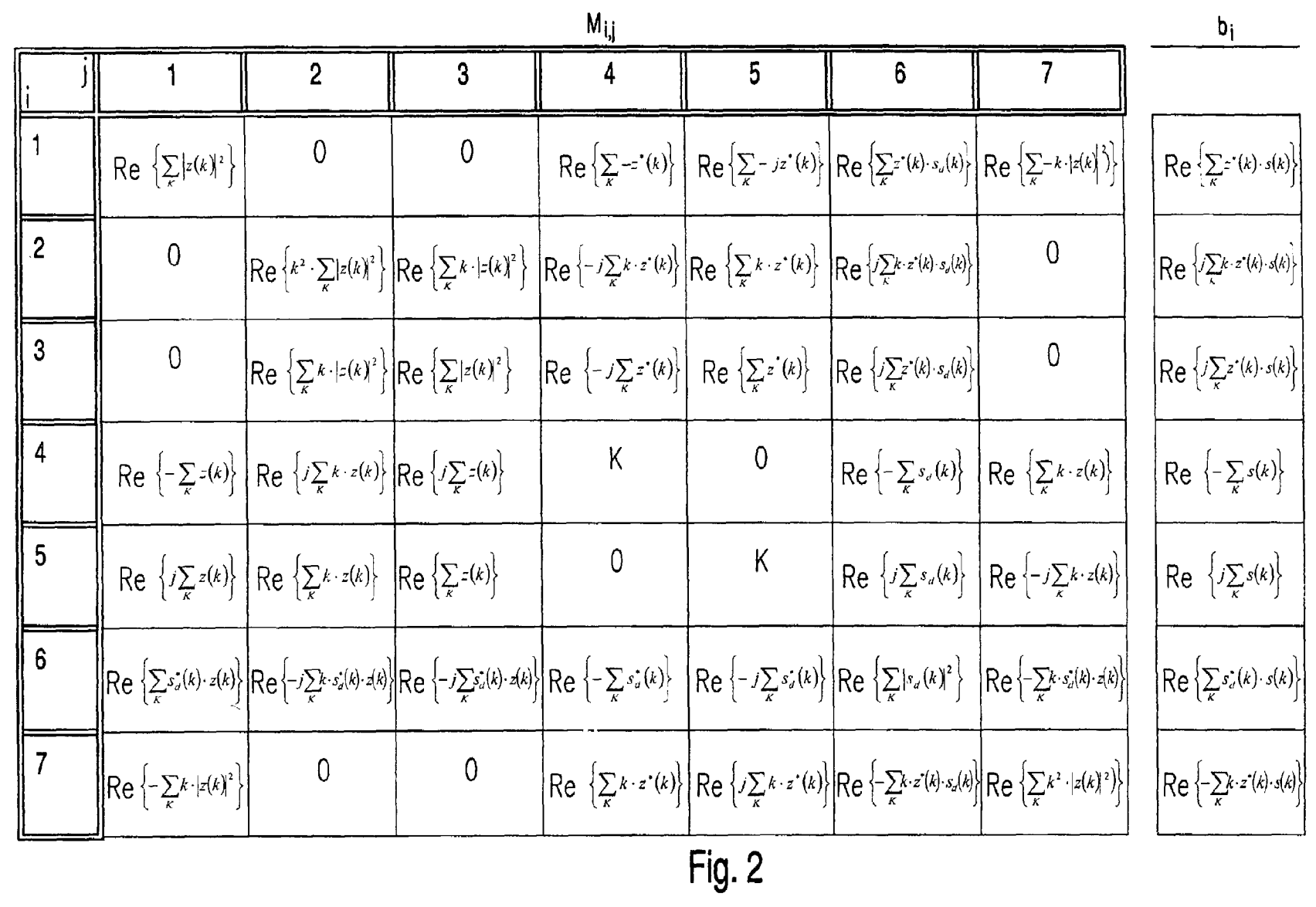

By substituting equation (13) into equation (15) the Matrix M and the Vector b is obtained, which is shown in FIG. 2.

By linearizing equation (8) and equation (9), the error-prone to the estimation vector $\hat{x}$ in equation (14) is negligible. According to a preferred advancement of the method of the invention, several iterations are performed. The error can be desirably reduced through several iterations. In the norm, the error is negligible after 2 iterations.

The following is applied:

| | |
|---|---|
| Iteratio: | The number of iterations to be performed; |
| loop=[1,Iteration]: | The parameter loop shows which iteration is currently being performed; |
| $x^{(loop)}$: | The index $^{(loop)}$ describes the value x of the loop-ed iteration (example: $\hat{\epsilon}^{(loop)}$, $M^{(loop)}$; |
| $z_{ov}^{(loop)}(K)$: | Over-sampled measurement signal of the loop-ed iteration, with the linearized estimated parameters compensated; and |
| $z^{(comp)}(k)$: | Measurement signal, with all estimated parameters compensated. From this sequence, the EVM-error EVM(k) is calculated. |

Figure 3:
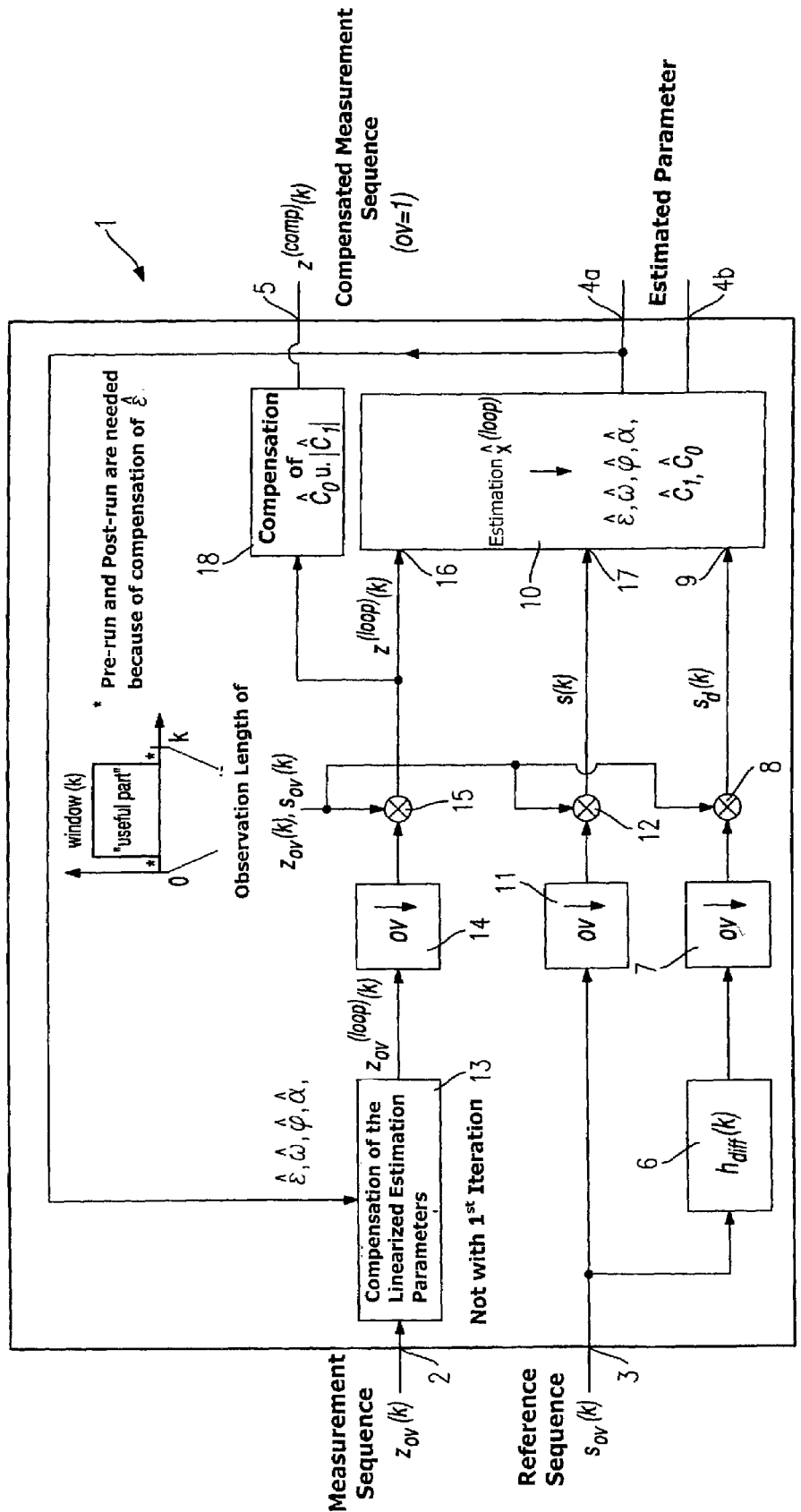
FIG. 3 is a block diagram, illustrating a preferred embodiment.

FIG. 3 is a block diagram illustrating the iterative method for estimating parameters. Before the embodied refined parameter estimation, a coarse estimation and compensation of the frequency ω, phase φ, and time shift ε, has to be performed.

On the inputs 2 and 3 of a refined estimator 1, the over-sampled measurement sequence (receiver sequence) $z_{ov}(k)$, and the reference sequence $s_{ov}(k)$, are given, respectively. On outputs 4a and 4b the estimated parameters are present, and on an output 5 the relative $C_0$ and $C_1$ from a compensator 18 having a compensator receiver sequence $z^{(comp)}(k)$ (in a symbol pulse), are present.

From the over-sampled reference signal $s_{ov}(k)$, the normed differential sequence is calculated with the impulse answer $h_{diff}(k)$ in a filter 6. Subsequently, in a reducing rate sampler 7 the down-sampling-factor ov is down sampled, followed by time slotting by a multiplier 8. Therewith, on the input 9 of the estimation block 10, lies the sequence $s_d(k)$ in a symbol pulse. Through a sampling rate reducer 11 and a multiplier 12, in which the time slotting takes place, the unfiltered, down-sampled and slotted reference sequence s(k) can be fed to an input 17 of the estimation block 10.

For the estimation, only the valid symbols ("useful symbols") are used, wherefore a slotting before the estimation must be performed. In the over-sampled input signals a pre-run and post-run are needed. The reason therefore is that a FIR (finite impulse response) filter 6 needs a rise time for the differentiation and also for the non-pictured interpolation filter, to compensate the estimated time shift $\hat{\epsilon}$. If a plurality of iterations are performed, the measurement sequence $z_{ov}(k)$, at the beginning of the next iteration, has to be compensated with the actual total estimation value in a compensator 13, and before the compensated measurement sequence $z_{ov}^{(loop)}(k)$ is fed to an input 16, it goes through the reducing rate sampler 14 and the multiplier 15, in which the time slotting takes place.

The following points have to be thereby regarded:

Only the linearized estimation parameters ($\hat{\epsilon}$, $\hat{w}$, and $\hat{\phi}$) are compensated at the beginning of a new iteration.

For the linearized estimation parameters it applies that: the linearized (refined)-estimation value of the loop-ed iteration are $\hat{\epsilon}^{(loop)}$, $\hat{w}^{(loop)}$ and $\hat{\phi}^{(loop)}$. The total estimation value according to the loop-ed iteration results through addition of all of the past estimation values according to:

$$\hat{\epsilon} = \sum_{l=1}^{loop} \hat{\epsilon}^{(l)} \quad (16)$$

$$\hat{w} = \sum_{l=1}^{loop} \hat{w}^{(l)}$$

$$\hat{\varphi} = \sum_{l=1}^{loop} \hat{\varphi}^{(l)}$$

With these instantaneous total estimation values, the measurement sequence will be compensated in the next iteration.

With every new iteration, the measurement sequence $z_{ov}(k)$ is compensated with the actual total estimation values $\hat{\epsilon}$, $\hat{w}$ and $\hat{\phi}$ of the linearized parameters.

The non-linearized estimation values ($\hat{C}_0$ and $|\hat{C}_1|$) are not compensated for, in the single iterations, but are newly calculated in every iteration. Otherwise, false reproductions may arise because of the linearization error in the single iterations.

It is to be heeded, that the estimated time shift $\hat{\epsilon}$ is not compensated in the reference signal, but in the measurement signal (input signal). Through which, according to the measurement regulation, the standards are achieved, in that the measurement signal is interpolated on the inter-symbol-interference-free symbol time point.

After the last iteration loop-iteration, the equation (16) of the resultant total estimation value of the linearized parameter is present. The non-linearized parameters are taken from the calculation of the last iteration. Finally, the compensated measurement sequence $z^{(comp)}(k)$ in FIG. 3, must be calculated, which is needed for the calculation of the estimated EVM-vector, according to:

$$z^{(comp)}(k) = \frac{z^{(loop)}(k)}{|\hat{C}_1|} - \frac{\hat{C}_0}{\hat{C}_1} \quad (17)$$

When the method according to the invention is utilized in a CDMA (Code Division Multiple Access) signal, the reference signal comprises a plurality of superimposed partial signals from different code channels and always one parameter for every partial signal describes the different amplifications of the different code channels. The amplification-parameter of the different partial signals is estimated simultaneously with the method according to the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for shared estimation of a plurality of transmission channel parameters for use of determining an error-vector magnitude, the plurality of transmission channel parameters with an error vector e(k) describing the relationship between a digitally modulated reference signal s(k) inputted to a transmission channel and a received receiver signal z(k) which is at a receiving end of the transmission channel, where k is a symbol number, said method comprising the steps of:

inputting the reference signal s(k) at a transmitting end of the transmission channel and receiving the received receiver signal z(k) at the receiving end of the transmission channel;

forming the error vector e(k) in dependence of the plurality of transmission channel parameters, the reference signal s(k), and the receiver signal z(k);

linearizing the error vector e(k);

substituting each real parameter of the linearized error vector through a corresponding real component of an estimation vector $\hat{x}$ to obtain a form of $$e(k) = \sum_{i=1}^{7} x_i \cdot f_i(k) - s(k)$$

wherein the real components of the estimation vector $\hat{x}$ is defined as a real estimation value vector $x=(x_1 x_2 x_3 x_4 x_5 x_6 x_7)^T$, $x_i$ is the $i^{th}$ real parameter of the real estimation vector x, $f_i(k)$ is the $i^{th}$ function corresponding to $x_i$, and i=1–7;

inserting the form $$e(k) = \sum_{i=1}^{7} x_i \cdot f_i(k) - s(k)$$

into a cost function, $$L(\tilde{x}) = \sum_K |\tilde{e}(k)|^2$$

wherein K is a symbol number within an evaluation area; and determining the estimation vector $\hat{x}$ through gradient development of the cost function and subsequently setting the gradient to zero.

2. The method according to claim 1, wherein the method steps are at least once iteratively repeated, to reduce the linearization error.

3. The method according to claim 1, wherein the transmission channel parameters include a time shift $\epsilon$, a phase shift $\phi$, a amplification $|C_1|$, a constant level shift $C_0$, an amplitude change $\alpha$ and a frequency shift $\Delta\omega$, which determine the reference signal s(k) on the transmission channel, and wherein $C_1$ is a complex amplification.

4. The method according to claim 3, wherein the error vector e(k), in dependence of the transmission channel parameters ($\epsilon,\phi,|C_1|, C_0, \alpha, \Delta\omega$), the reference signal s(k), and the received receiver signal z(k), has a form of $$e(k) = \frac{1}{|C_1|} \cdot z(k) \cdot e^{-\alpha k - j\Delta\omega k T_s - j\varphi} - \frac{C_0}{C_1} - s(k - \varepsilon),$$

wherein $T_s$ is a symbol period, and a signal sequence, is in a signal pulse, and is present to time points $k \cdot T_s$, and wherein $C_1 = |C_1| \cdot e^{j\phi}$ is applied.

5. The method according to claim 4, wherein through linearization, an exponential function of the error vector e(k), by Taylor series expansion, is linearized to the first order, such that the linearized error vector results in $$e(k) = \frac{1}{|C_1|} \cdot z(k) \cdot [1 - \alpha k - j \cdot \Delta\omega k T_s - j\varphi] - \frac{C_0}{C_1} - [s(k) - \varepsilon \cdot s_d(k)].$$

wherein $s_d(k)$ is a normed derivative of s(k).

6. The method according to claim 5, wherein in the linearized error vector the substitutions $|C_1|=1/x_1$ $\Delta\omega T_s = x_2 \cdot |C_1|$ $\Delta\phi = x_3 \cdot |C_1|$ $C_1 = |C_1| \cdot e^{j\phi}$ $C_0 = C_1 \cdot (x_4 + j \cdot x_5)$ $\epsilon = x_6$ $\alpha = x_7 \cdot |C_1|$ are made, to produce the real estimation value vector:

$x = (x_1 x_2 x_3 x_4 x_5 x_6 x_7)^T$.

7. The method according to claim 1, wherein the reference signal is a GSM EDGE-Signal, in particular a mobile radio signal, that is defined in GSM 05.05, version 8.5.0, Draft ETSI EN 300 910 V.8.5.0, (2000-07), Annex G.

8. The method according to claim 1, wherein the reference signal comprises a plurality of superimposed partial signals from different code channels and wherein always at least one parameter for every partial signal describes the different amplifications of the different code channels.

9. The method according to claim 8, wherein the reference signal is a CDMA signal, in particular a mobile radio signal that is defined by the standards 3GPP TS 25.141, 3GPP2 C.S0010-A, 3GPP2 C.S0011-A, 3GPP2 C.P9011, or 3GPP2 C.P9012.

10. A computer program with program code resources to perform all of the steps according to claim 1, when the computer program is executed on a computer or a digital signal processor.

11. A computer program with program code resources to perform all of the steps according to claim 1, when the computer program is stored on a machine-readable data medium.

12. A computer program product, having program code resources stored on a machine readable medium, to perform all of the steps according to claim 1, when the program is executed on a computer or a digital signal processor.

* * * * *